(12) United States Patent
Chen et al.

(10) Patent No.: US 9,367,215 B2
(45) Date of Patent: Jun. 14, 2016

(54) MOBILE DEVICES AND RELATED METHODS FOR CONFIGURING A REMOTE DEVICE

(71) Applicant: ATHENTEK INCORPORATED, Taipei (TW)

(72) Inventors: Chun-Nan Chen, Taipei (TW); Chiu-Ting Liao, Taoyuan County (TW)

(73) Assignee: AthenTek Incorporated, Taipei (TW)

( * ) Notice: Subject to any disclaimer, the term of this patent is extended or adjusted under 35 U.S.C. 154(b) by 129 days.

(21) Appl. No.: 14/524,168

(22) Filed: Oct. 27, 2014

(65) Prior Publication Data

US 2015/0319569 A1 Nov. 5, 2015

Related U.S. Application Data

(60) Provisional application No. 61/986,714, filed on Apr. 30, 2014.

(51) Int. Cl.
| | |
|---|---|
| H04W 24/00 | (2009.01) |
| G06F 3/0484 | (2013.01) |
| H04W 4/02 | (2009.01) |
| H04W 4/14 | (2009.01) |
| H04W 12/08 | (2009.01) |
| H04W 4/00 | (2009.01) |

(52) U.S. Cl.
CPC .......... *G06F 3/0484* (2013.01); *G06F 3/04842* (2013.01); *G06F 3/04845* (2013.01); *H04W 4/021* (2013.01); *H04W 4/028* (2013.01); *H04W 4/14* (2013.01); *H04W 12/08* (2013.01); *H04W 4/001* (2013.01)

(58) Field of Classification Search
None
See application file for complete search history.

(56) References Cited

U.S. PATENT DOCUMENTS

| | | | | |
|---|---|---|---|---|
| 2009/0289791 | A1* | 11/2009 | Onishi | B25J 9/1676 340/555 |
| 2013/0214926 | A1* | 8/2013 | Huang | G08B 21/24 340/539.13 |

* cited by examiner

*Primary Examiner* — Suhail Khan (57) ABSTRACT

A method for configuring a remote device in a mobile device is provided. The method includes the steps of providing a dialogical user interface, obtaining a first position of the remote device, displaying a question message including information of the first position via the dialogical user interface, receiving an answer message corresponding to the question message via the dialogical user interface, and determining whether to set the first position as a safe zone for the remote device in response to whether the answer message is a confirmation message or a rejection message, wherein when the answer message is the conformation message, setting the first position as the safe zone of the remote device and displaying the setting result via the dialogical user interface.

16 Claims, 11 Drawing Sheets

MOBILE DEVICES AND RELATED METHODS FOR CONFIGURING A REMOTE DEVICE

CROSS REFERENCE TO RELATED APPLICATIONS

This Application claims priority of U.S. Provisional Application No. 61/986,714, filed on Apr. 30, 2014, and the entirety of which is incorporated by reference herein.

BACKGROUND OF THE INVENTION

1. Field of the Invention

The invention generally relates to mobile devices and related methods thereof, and more particularly, to mobile devices and related methods for configuring a remote device via a dialogical user interface.

2. Description of the Related Art

A tracking system is used for the observing of persons or objects on the move and supplying a timely ordered sequence of respective location data to a model. A tracking system may employ a tracking device that is applied to the person or object being tracked and transmits an alert and message including the person's or object's location via SMS or E-mail message when they leave and/or arrive a predefined safe zone. Currently, to define a safe zone, a user may first input position information such as a point of interest (POI) via a user interface of an application and then the application searches and finds a candidate list corresponding to the position information and provides the candidate list which includes a number of possible POIs for selection. Thereafter, the user may need to select the correct POI from the candidate list and drags the circle on a map related to the selected POI to change the center of the selected POI and the alert radius so as to define the safe zone. In such conventional user interface for defining a safe zone, however, it is not friendly for a user who is not familiar with map control. Moreover, the alert or safe zone position is completely selected by the user, but the user may not know a proper location for configuration sometimes.

BRIEF SUMMARY OF THE INVENTION

Accordingly, embodiments of the invention provide mobile device and method for configuring a remote device. In one aspect of the invention, a method for configuring a remote device in a mobile device is provided. The method includes the steps of providing a dialogical user interface, obtaining a first position of the remote device, displaying a question message including information of the first position via the dialogical user interface, receiving an answer message corresponding to the question message via the dialogical user interface, and determining whether to set the first position as a safe zone for the remote device in response to whether the answer message is a confirmation message or a rejection message, wherein when the answer message is the conformation message, setting the first position as the safe zone of the remote device and displaying the setting result via the dialogical user interface.

In another aspect of the invention, a mobile device is provided which comprises a storage device, a display device and a processor coupled to the storage device and the display device. The processor is configured to provide a dialogical user interface on the display device, obtain a first position of the remote device, display a question message including information of the first position via the dialogical user interface, receive an answer message corresponding to the question message via the dialogical user interface, and determine whether to set the first position as a safe zone for the remote device in response to whether the answer message is a confirmation message or a rejection message, wherein when the answer message is the conformation message, the processor is further configured to set the first position as the safe zone of the remote device and display the setting result via the dialogical user interface.

Other aspects and features of the present invention will become apparent to those with ordinarily skill in the art upon review of the following descriptions of specific embodiments of methods for configuring a remote device for use in a mobile device.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The following description is of the best-contemplated mode of carrying out the invention. This description is made for the purpose of illustrating the general principles of the invention and should not be taken in a limiting sense.

Embodiments of the invention provide mobile devices and methods for configuring a remote device thereof can provide a dialogical user interface for alert or safe zone setting of the remote device and the alert or safe zone position can be recommended by applications or cloud service automatically and confirmed by user, thereby making the configuration operations easier and more friendly for the users.

Figure 1:
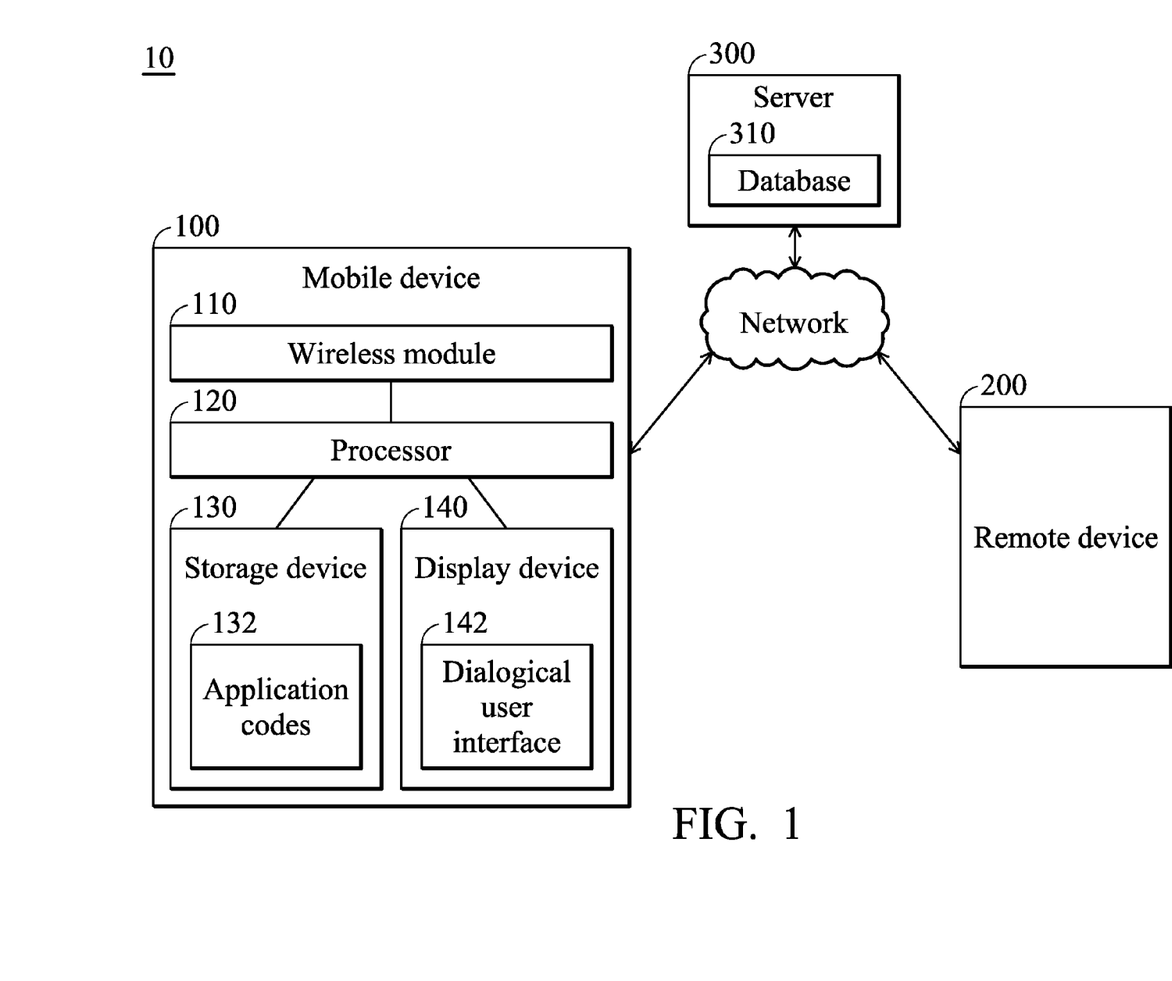
FIG. 1 is a schematic diagram illustrating a tracking system including a mobile device according to an embodiment of the invention.

FIG. 1 is a schematic diagram illustrating a tracking system including a mobile device according to an embodiment of the invention. As shown in FIG. 1, the tracking system 10 may at least comprise a mobile device 100, a remote device 200 and a server 300. The mobile device 100, the remote device 200 and the server 300 are coupled and communicated to each other over a connected network. In some embodiments, the mobile device 100 may be a device that is equipped with a user interface, such as a mobile phone, a smart phone, or a PDA and so on. The mobile device 100 can be wirelessly connected to one or more remote devices 200 such as a positioning device via the server 300 (e.g., a cloud server) so that the mobile device 100 can communicate with the remote devices 200 to configure, monitor and/or control them.

The mobile device 100 comprises a wireless module 110, a processor 120, a storage device 130 and a display device 140. The wireless module 110 receives signals from and transmits signals to a current associated network. It is to be understood that integrating the processor 120 into the wireless module 110 is also available. The wireless module 110 may be coupled to one or more antennas (not shown) and may allow communications with one or more additional devices, computers and/or servers using a wireless network. The mobile device 100 may support various communications protocols, such as the code division multiple access (CDMA), Global System for Mobile Communications (GSM), Enhanced Data GSM Environment (EDGE), High-Speed Downlink Packet Access (HSDPA), Wi-Fi (such as IEEE 802.11a/b/g/n), Bluetooth, and Wi-MAX communication protocol, and a protocol for emails, instant messaging (IM), and/or a short message services (SMS), but the invention is not limited thereto. The processor 120 may be one or more data processors, image processors and/or central processors, which are capable of executing one or more types of computer readable medium stored in the storage device 130 such as a memory. In some embodiments, the wireless module 110 may be a cellular modem that provides mobile communication functionality based on the capabilities of the underlying hardware.

The storage device 130 may be a memory of the mobile device 100 and also may be an external storage card, such as a smart media (SM) card or secure digital (SD) card, for example. The application codes 132 stored in the storage device 130 are executed by the processor 120 to display a dialogical user interface (DUI) 142 on the display device 140 (e.g. a touch panel) for the user to configure a remote device 200 (such as a vehicle, an equipment, or a person who carries a GPS tracking unit and so on), monitor the position of a tracking person or object of the remote device 200 and query information about the remote device 200. The display device 140 is configured to display related data, such as texts, figures, interfaces, and/or related information. It is understood that, in some embodiments, the display device 140 may be integrated with a touch-sensitive device (not shown). The touch-sensitive device has a touch-sensitive surface comprising sensors in at least one dimension to detect contact and movement of at least one object (input tool), such as a pen/stylus or finger near or on the touch-sensitive surface. Users can input related commands or signals via the screen of the display device 140.

The remote device 200 may be, for example (but not limited to), a positioning device capable of providing GPS location reporting and/or monitoring device for monitoring a number of events. In some embodiments, the remote device 200 may further comprise a number of sensors (not shown) which may be turned on or off by the server 300. While being turned on, each sensor will perform sensing operation to obtain a sensing result and report the sensing result to the server. For example, in a location-based service such as identifying the position of the remote device 200, the position of the remote device 200 is located and tracked by a network server over time using a positioning technology such as the global positioning system (GPS), and tracking data are provided to the mobile device 100 (such as a smartphone) to depict the status or motion of the remote device 200 via the dialogical user interface 142 on the display device 140. In some embodiments, the sensor may be a GPS sensor, a temperature sensor or a humidity sensor or other sensors, but the invention is not limited thereto. For example, when the remote device 200 is a GPS device with a GPS sensor (e.g. a GPS receiver), the remote device 200 can obtain a GPS signal using the GPS sensor, generate a GPS location according to the GPS signal and report the GPS location to the server. Position information of the remote device 200 may be detected by the GPS sensor (not shown) of the remote device 200. The position information may indicate the appearance position (e.g., at which the remote device appears) of the remote device 200, e.g., at an exact latitude and longitude location (detected by the GPS sensor). In some embodiments, the position information may further show the route taken by the tracked object, e.g., a series of exact latitude and longitude locations (detected by the GPS sensor).

The processor 120 which is coupled to the wireless module 110, the storage device 130 and the display device 140 can control the wireless module 110, the storage device 130 and the display device 140 to perform the method for configuring a remote device of the present invention, which will be discussed further in the following paragraphs. To be more specific, the user of the mobile device 100 may configure the remote device 200 remotely or obtain information from the remote device 200 via the dialogical user interface 142. Note that the dialogical user interface 142 is supposed to behave as a nice, reasonable, friendly person who can carry a conversation in mostly a Question/Answering (QA) mode to act as the person or object being tracked, where the questions are all geared towards getting or giving location or sensor specific information related to the remote device 200. To be more specific, in one embodiment, the remote device 200 of the tracked object (e.g. a child) can be referred to as a first peer to chat with a second peer (e.g. the parent of the child) in a Question/Answering (QA) mode using peer-to-peer instant messages to obtain the setting data for the remote device 200 during the conversation through the dialogical user interface 142.

Figure 4A:
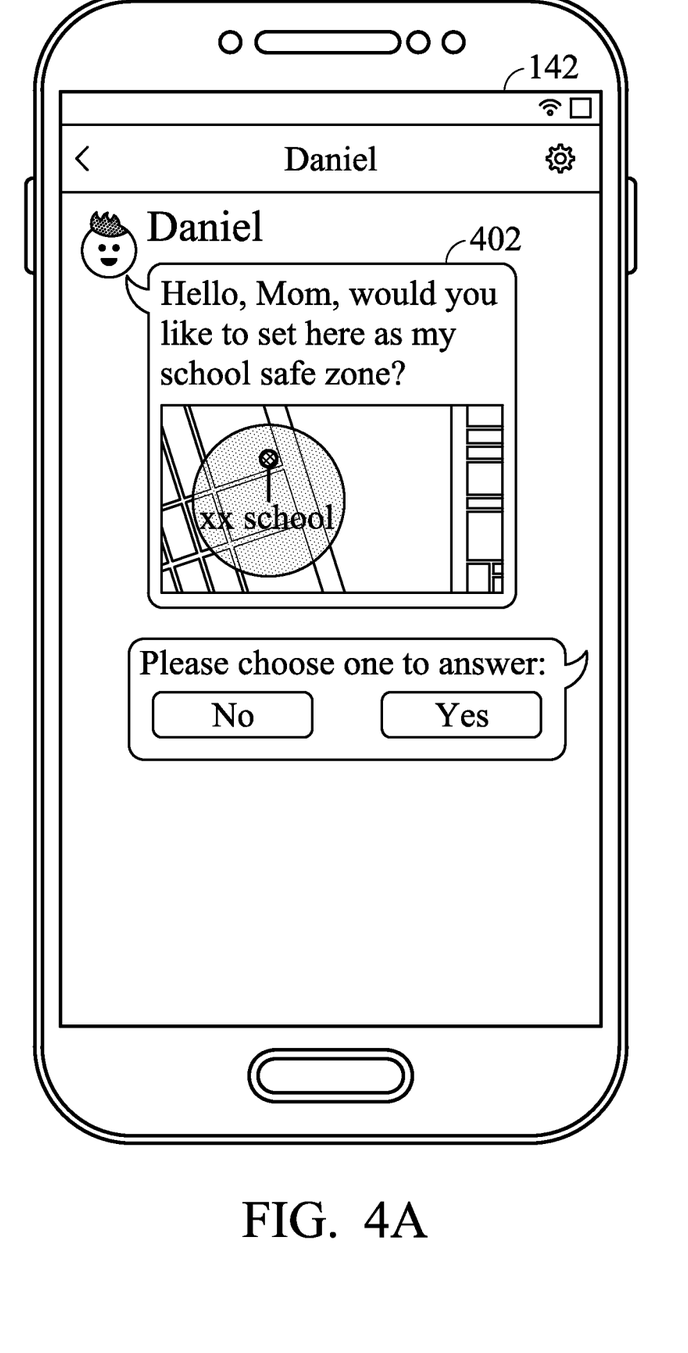
FIGS. 4A to 4H are schematic diagrams illustrating embodiments of dialogical user interfaces of the invention.
Figure 4B:
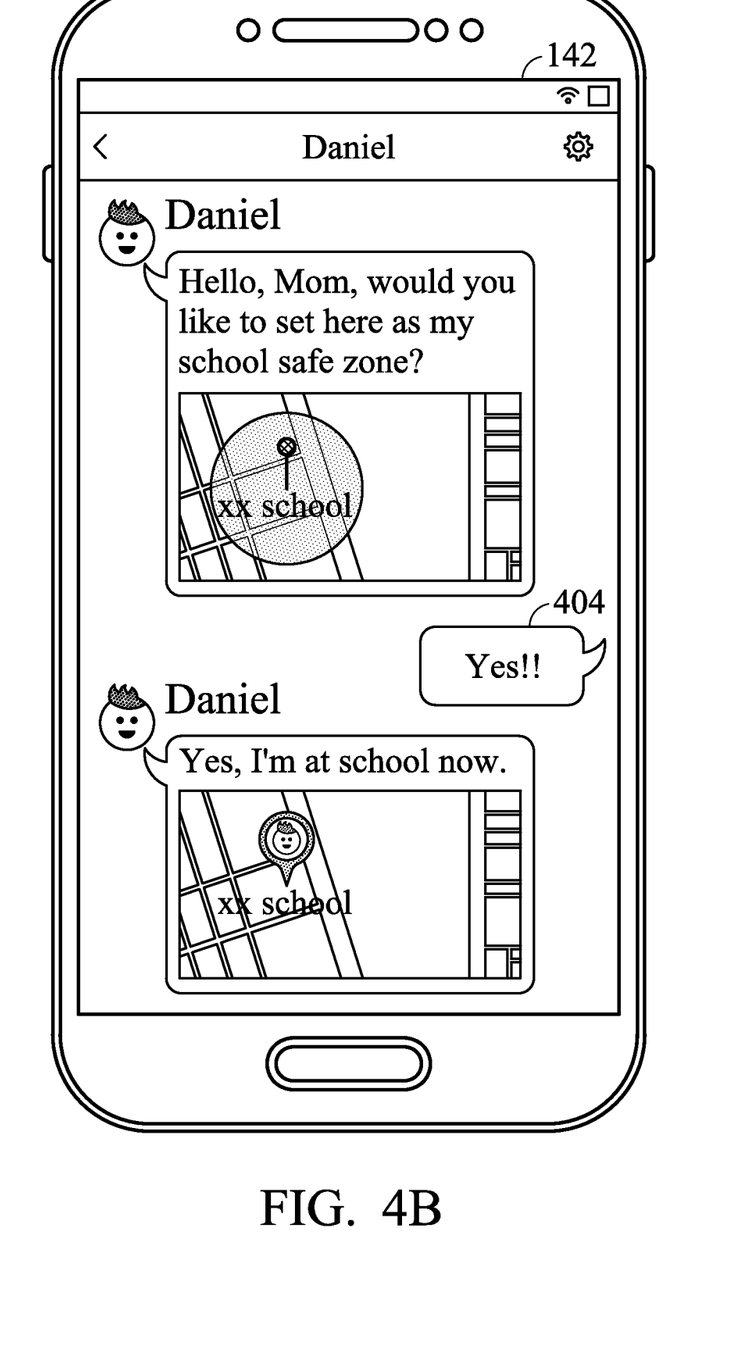
Figure 4C:
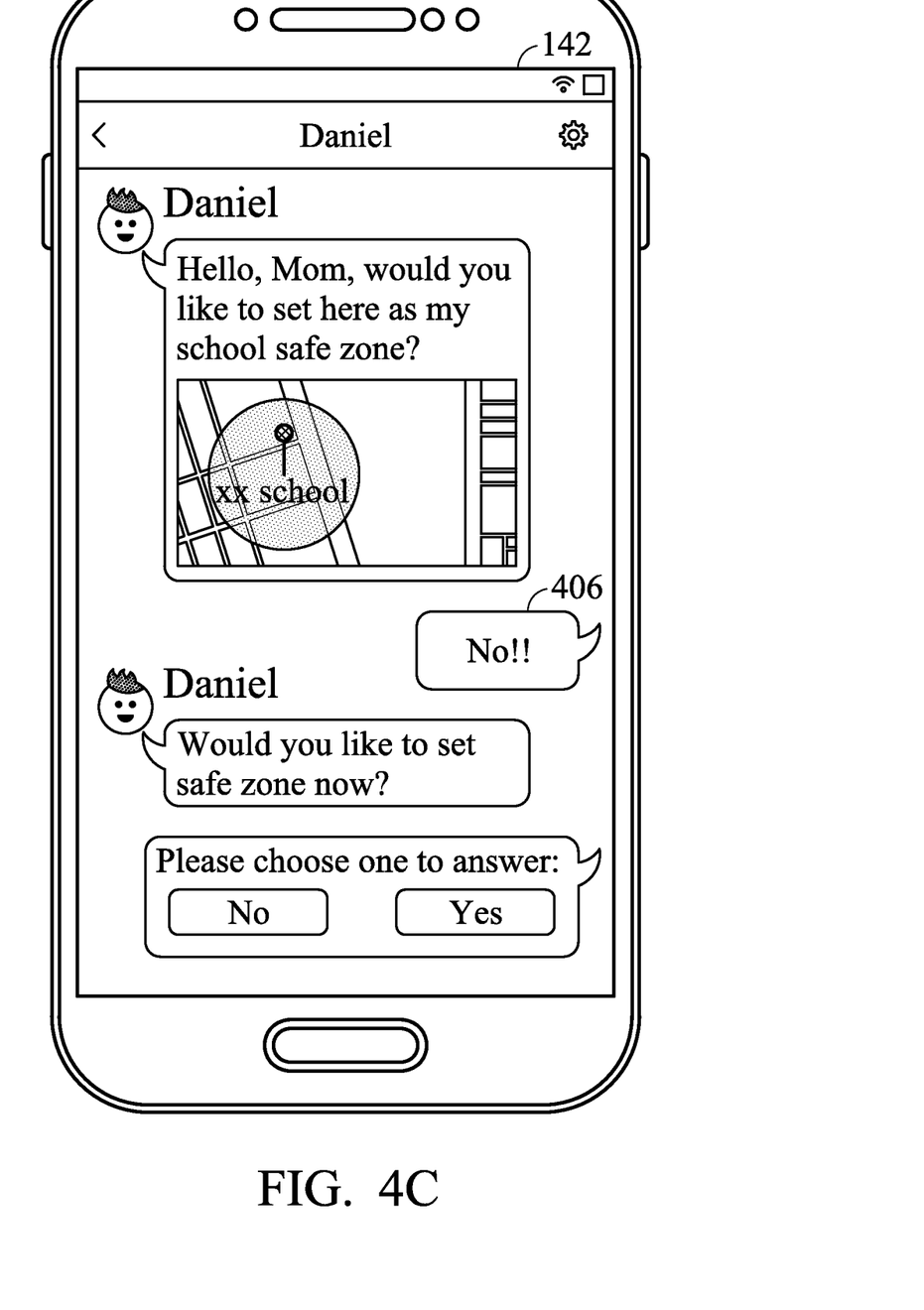
Figure 4D:
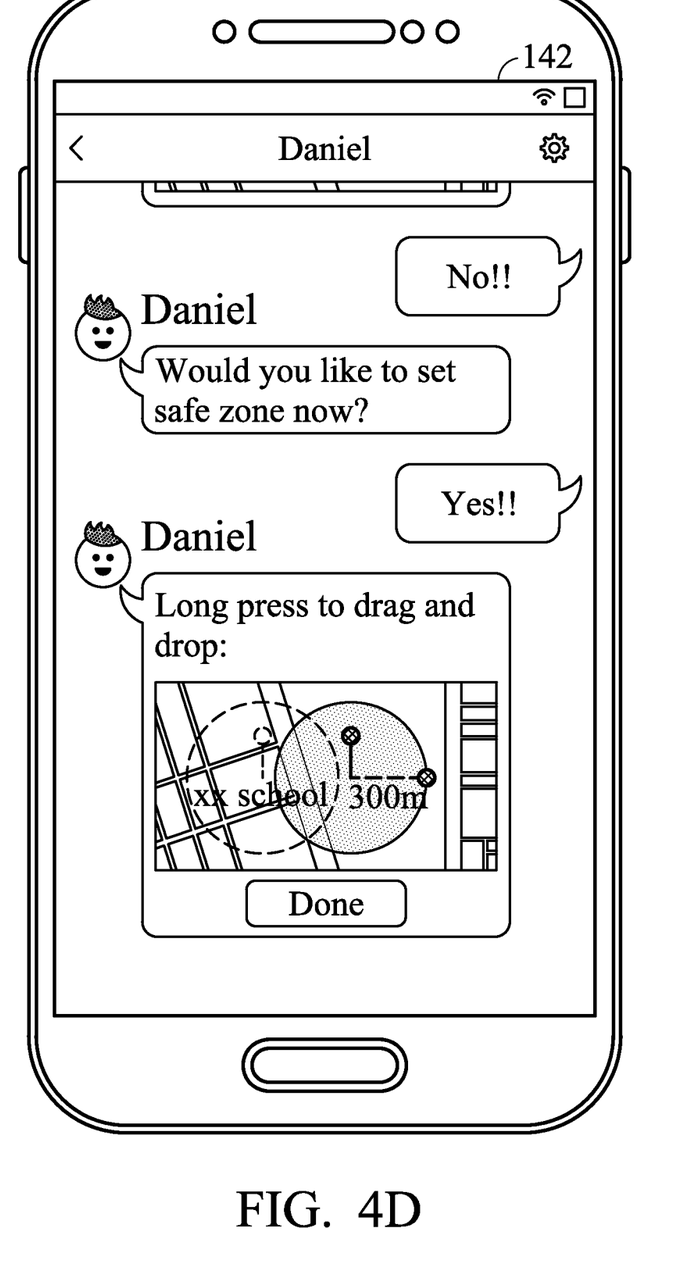
Figure 4E:
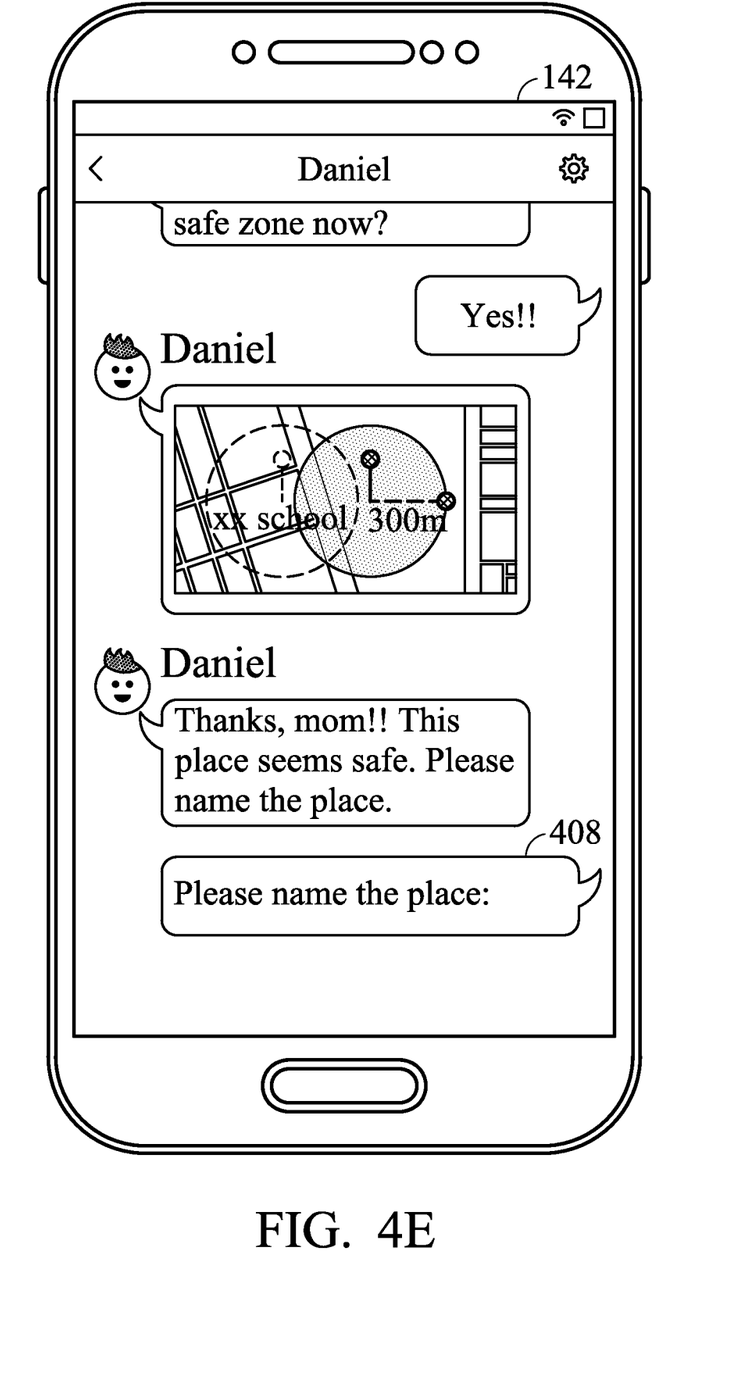
Figure 4F:
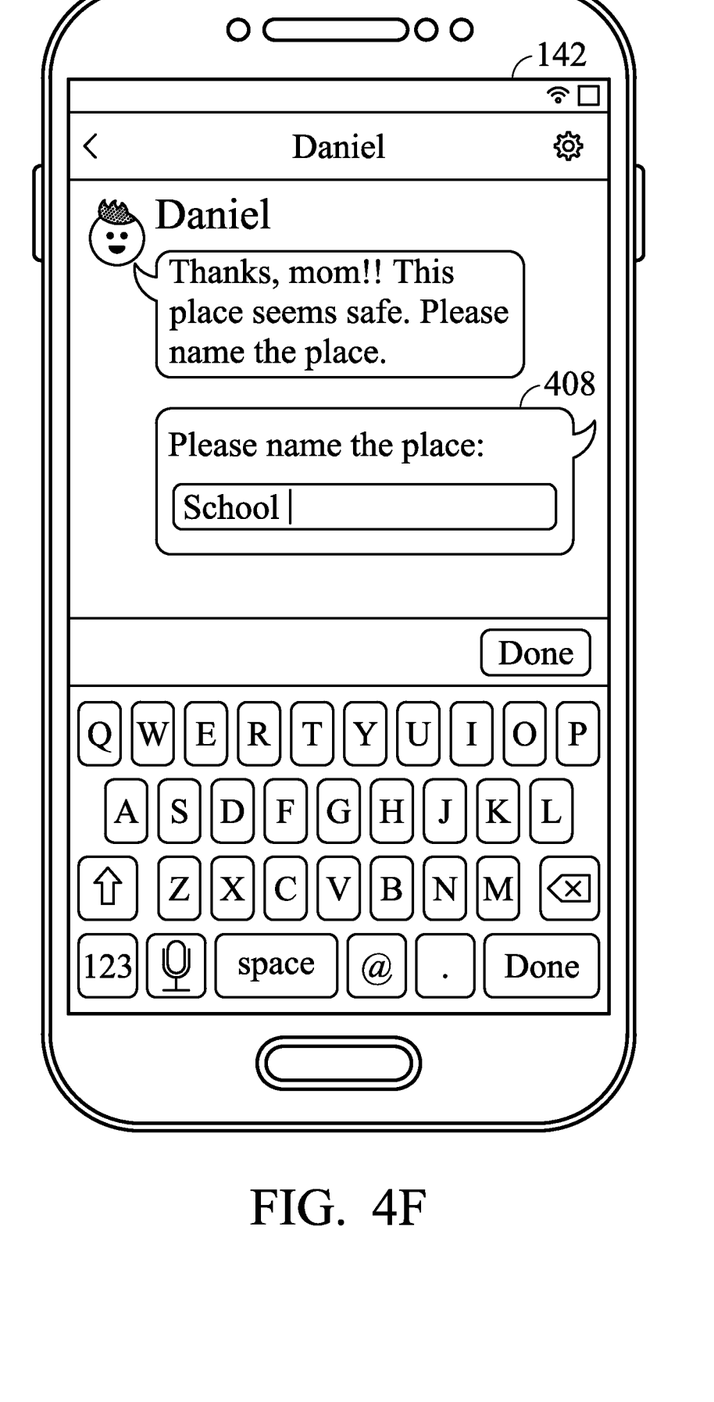
Figure 4G:
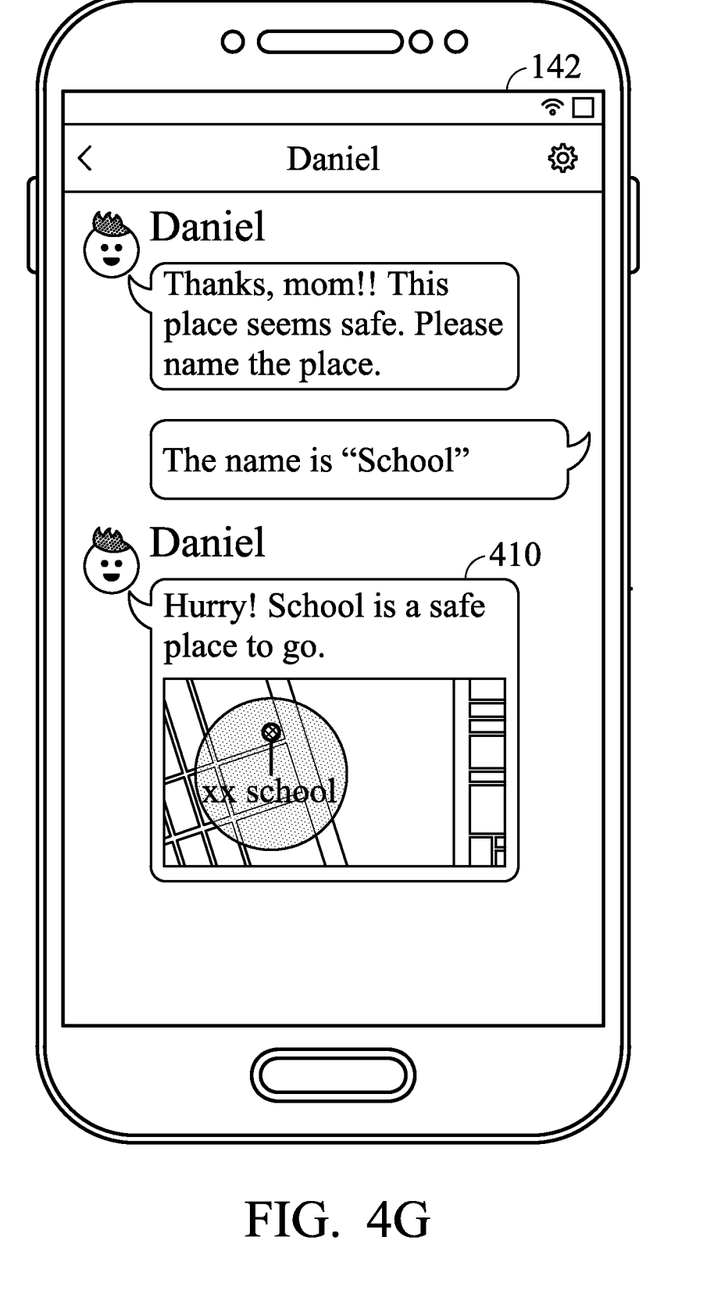
Figure 4H:
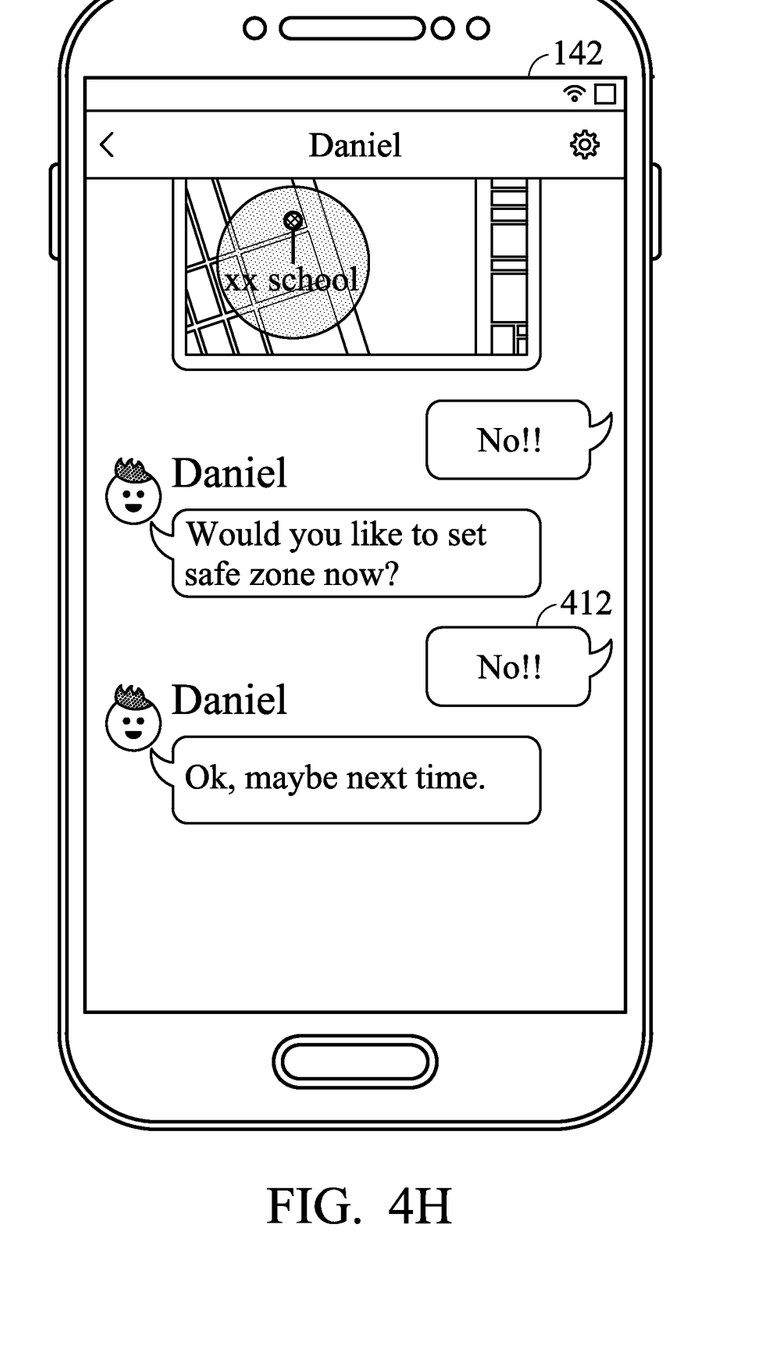

Referring to FIGS. 4A-4H, which show several exemplary dialogical user interfaces for configuring the remote device according to the invention, wherein Daniel is the name of the tracked object of the remote device 200. As shown in FIG. 4A, the dialogical user interface 142 may interact with the user of the mobile device 100 to allow the user to configure the remote device 200. In some embodiments, the user may configure a safe zone of the remote device 200 and/or a safe route between safe zones (e.g. a safe route from the safe zone of school to the safe zone of home) via the dialogical user interface 142. For example, the processor 120 may determine a recommend safe zone of the school based on historical-data stored in the database 310 of the server 300 and display a question message 402 of "Hi, mom, would you like to set here as my school safe zone?" to ask the user whether to set it as a safe zone (as shown in FIG. 4A), and the user may set the safe zone of the remote device 200 via the dialogical user interface 142 by entering an answer message 404 of "Yes" (also referred to as a confirmation message) in response to this question message (as shown in FIG. 4B). In one embodiment, if the recommended safe zone is not proper, the user may manually define the safe zone of the remote device 200 via the dialogical user interface 142 by entering an answer message 406 of "No" (also referred to as a rejection message) in response to the question message of "Hi, mom, would you like to set here as my school safe zone?" and then adjusting the position of the safe zone and/or the radius of the safe zone by dragging and dropping the circle displayed on the map, as shown in FIGS. 4C-4D. After the adjusting of the safe zone is done, the dialogical user interface 142 displays another message 408 for instructing the user to enter a name of the safe zone, as shown in FIG. 4E. The user can enter the name of the safe zone via a virtual keyboard displayed on the dialogical user interface, as shown in FIG. 4F. Once the setting is completed, the dialogical user interface 142 displays a completion message 410 in response to the setting, as shown in FIG. 4G. If the user does not want to configure a recommended safe zone of the remote device 200 as shown in the displayed map as the safe zone at this time, the user may enter an answer message 412 of "No" in response to the question message of "would you like to set safe zone now?" to terminate the configuration operation, as shown in FIG. 4H.

After the safe zones have been set, the user of the mobile device 100 may further monitor the position of the tracked person or object by tracking the position of the remote device 200 via the dialogical user interface 142. When the tracked object equipped with the remote device 200 is not within the safe zones predefined, the server 300 may notify the user through transmitting a message to the mobile device 100 of the user. Upon receiving the message from the server 300, the processor 120 may then generate a notification message indicating that the position of the remote device is not within the set safe zone and present it as an instant message to the user of the mobile device 100 via the dialogical user interface 142. For example, the processor 120 may send a notification message of "Hi Mom, I am leaving the safe zone" to the user via the dialogical user interface 142 to inform the user that the position of the tracked object equipped with the remote device 200 is not within the predefined safe zones.

Figure 2:
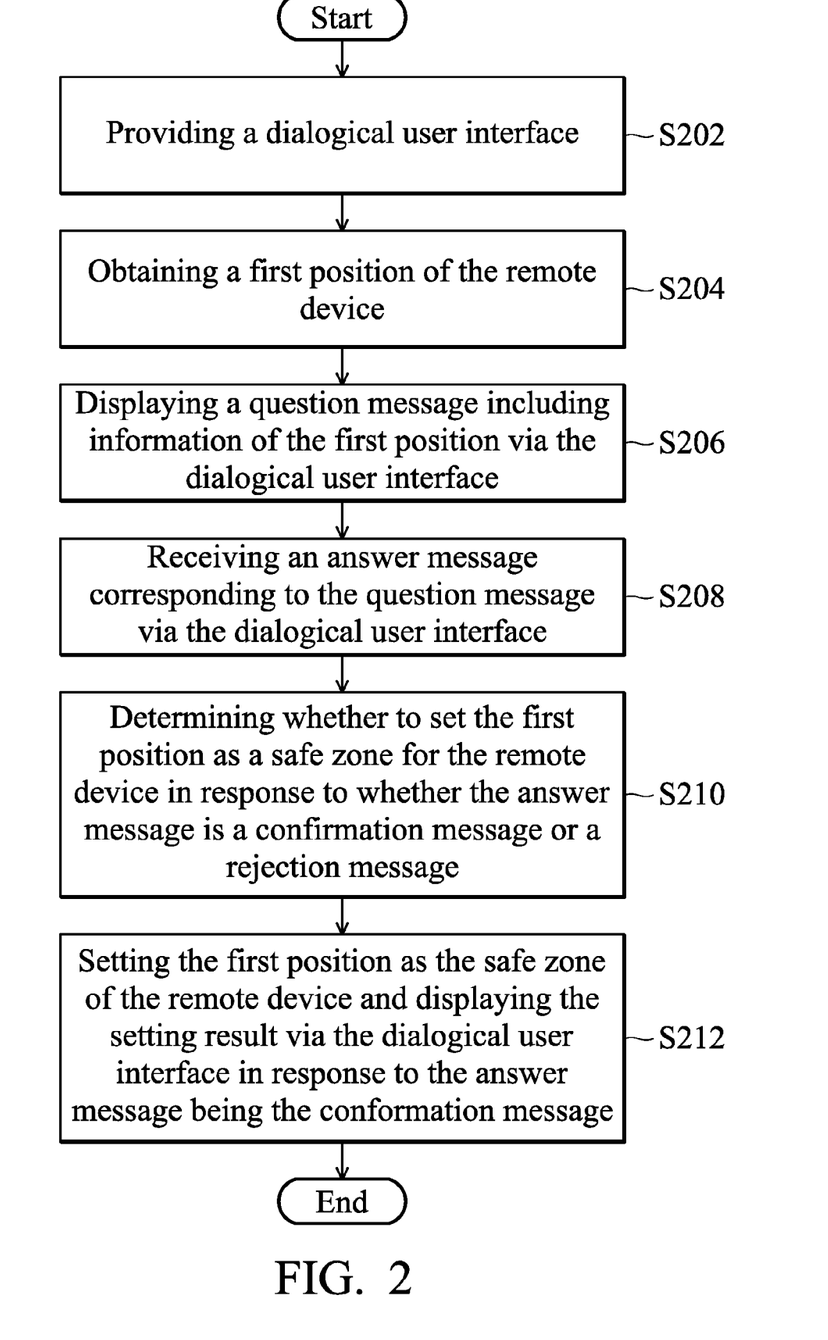
FIG. 2 is a flow chart illustrating a method for configuring a remote device according to an embodiment of the invention.

FIG. 2 is a flow chart illustrating a method for configuring a remote device according to an embodiment of the invention. The method can be applied to the mobile device 100 and performed by the processor 120 as shown in FIG. 1. The mobile device 100 may be, for example, a mobile device that is equipped with a user interface, such as a PDA (Personal Digital Assistant), a smart phone, a mobile phone, an MID (Mobile Internet Device, MID), a laptop computer, a car computer, a digital camera, a multi-media player, a game device, or any other type of mobile computational device, however, it is to be understood that the invention is not limited thereto. In this embodiment, the remote device 200 can provide position information of a tracking person or object equipped with the remote device 200.

When a user wants to set a safe zone of the remote device, in step S202, a dialogical user interface 142 as shown in FIG. 4A is first provided for configuring the remote device 200. The dialogical user interface 142 is supposed to behave as a nice, reasonable, friendly person who can carry a conversation in mostly a Question/Answering (QA) mode to act as the person or object being tracked, where the questions are all geared towards getting or giving location or sensor specific information related to the remote device.

Next, in step S204, a first position of the remote device is obtained. In some embodiments, the processor 120 may determine the first position indicating a recommend safe zone of the school based on historical-data stored in the database 310 of the server 300. Then, in step S206, a question message including information of the first position is displayed via the dialogical user interface 142 (as shown in FIG. 4A).

Thereafter, in step S208, the user may press a "Yes" or "No" button as shown in FIG. 4A for answering the question indicated by the question message and an answer message corresponding to the question message is received by the processor 120 via the dialogical user interface 142.

In step S210, it is further determined, by the processor 120, whether to set the first position as a safe zone for the remote device 200 in response to whether the answer message is a confirmation message or a rejection message. To be more specific, the user may press the "Yes" button to enter a confirmation message (as shown in FIG. 4B) or press the "No" button to enter a rejection message (as shown in FIG. 4C).

In response to the answer message being the conformation message, in step S212, the first position is set, by the processor 120, as the safe zone of the remote device 200 and the setting result is displayed via the dialogical user interface 142 (as shown in FIG. 4B).

In response to the answer message being the rejection message, it means that the recommended safe zone is not proper, and the user may manually define the safe zone of the remote device 200 via the dialogical user interface 142 by adjusting the position of the safe zone and/or the radius of the safe zone by dragging and dropping the circle displayed on the map, as shown in FIGS. 4C-4D. After the adjusting of the safe zone is done, the dialogical user interface 142 displays another message for instructing the user to enter a name of the safe zone, as shown in FIG. 4E. The user can enter the name of the safe zone via a virtual keyboard displayed on the dialogical user interface, as shown in FIG. 4F. Once the setting is completed, the dialogical user interface 142 displays a completion message in response to the setting, as shown in FIG. 4G.

In some embodiments, the processor 120 may further regularly obtain position information of the remote device 200 from the remote device 200 via the server 300 and display a message including the position information of the remote device 200 via the dialogical user interface 142.

In some embodiments, the remote device 200 may further comprise a number of sensors or modules (not shown), each of which can provide a respective sensor data, and the user may enter a query message including a query item to be queried to request information about the query item of the remote device 200. In one embodiment, the query item can be sensor data of a specific sensor of the remote device 200 and the specific sensor may be a GPS sensor, a temperature sensor or a humidity sensor or other sensors.

Figure 3:
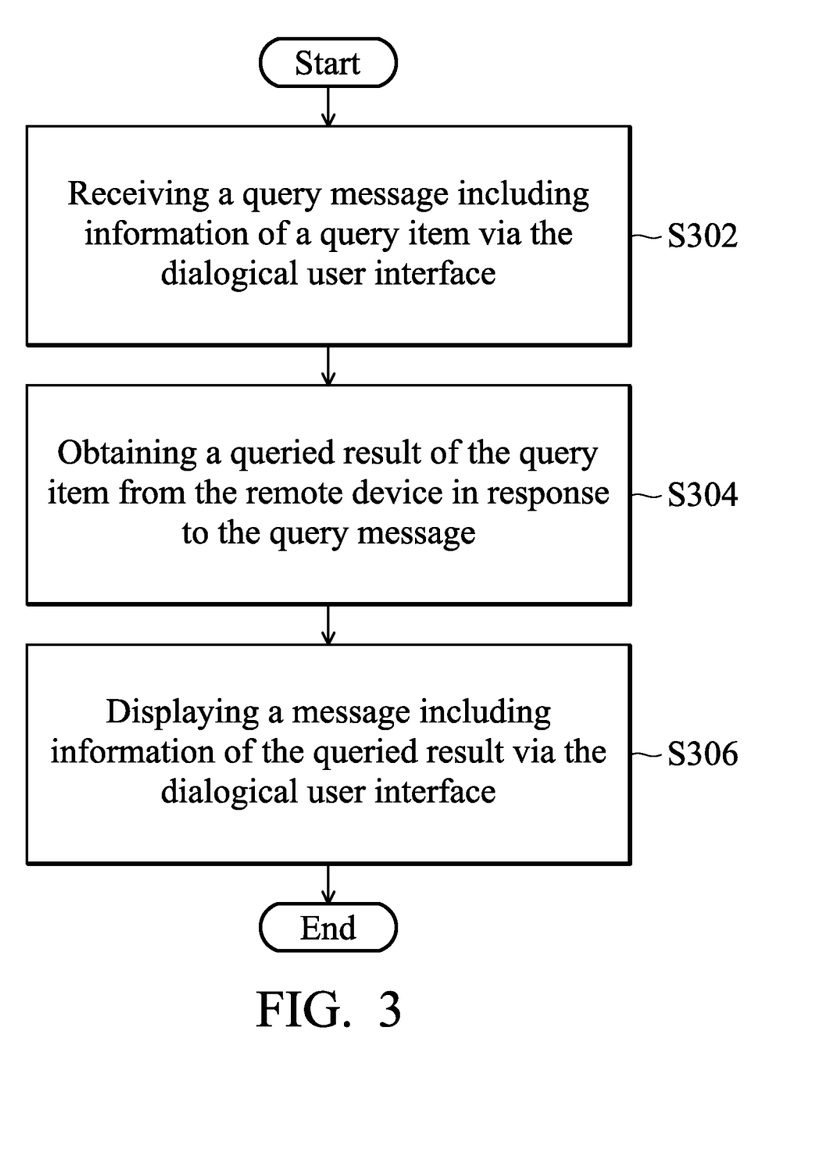
FIG. 3 is a flow chart illustrating a method for configuring a remote device according to another embodiment of the invention.

FIG. 3 is a flow chart illustrating a method for configuring a remote device according to another embodiment of the invention. The method can be applied to the mobile device 100 and performed by the processor 120 as shown in FIG. 1. The mobile device 100 may be, for example, a mobile device that is equipped with a user interface, such as a PDA (Personal Digital Assistant), a smart phone, a mobile phone, an MID (Mobile Internet Device, MID), a laptop computer, a car computer, a digital camera, a multi-media player, a game device, or any other type of mobile computational device, however, it is to be understood that the invention is not limited thereto. In this embodiment, the remote device may further comprise a number of sensors or modules for providing respective sensor data. The specific sensor may be, for example (but not limited to), a GPS sensor, a temperature sensor or a humidity sensor or other sensors. Each sensor may regularly perform sensing operation to obtain a sensing result and report the sensing result to the server 300 or it may be controlled by the server 300.

When the user wants to request information about a query item of the remote device 200, in step S302, the user may enter a query message including the query item to be queried and the query message including information of the query item is received by the processor 120 via the dialogical user interface 142. For example, the user may query data of any sensor of the remote device 200 via the dialogical user interface 142. The user may just need to ask, for example, "where are you?" or "what is the temperature?" or "what can you do for me?" or anything conceptually similar, the dialogical user interface 142 can display data related to the asked question.

Upon receiving the query message, in step S304, a queried result of the query item is obtained, by the processor 120, from the remote device 200 in response to the query message. Then, in step S306, a message including information of the queried result is displayed via the dialogical user interface 142. For example, in one embodiment, when the user enters a query message "where are you?", the processor 120 may analyze the query message and obtain an query item (i.e. the position of the tracked object) corresponding to the query message, and thus transmits a request to the server 300 to activate the GPS sensor of the remote device 200 to obtain the position of the remote device and display a resulting message including information about the queried result, such as a resulting message of "I am in school" or the like, on the dialogical user interface 142. In another embodiment, when the user enters message "what is the temperature?", the processor 120 may analyze the query message to obtain an query item (i.e. the temperature of the remote device) corresponding to the query message and transmit a request corresponding to the query item to the remote device 200 to obtain information about the query item from the remote device 200 through the server 300. For example, upon receiving the request, the server 300 may activate the temperature sensor of the remote device 200 to obtain the temperature measured by the temperature sensor of the remote device 200 and display the message including the measured temperature, such as a message of "The temperature is 26 degree" or the like, on the dialogical user interface 142.

In some embodiments, the user may further request the remote device 200 to perform further operations based on the queried information. For example, in one embodiment, if the remote device 200 is further configured to control an air conditioner, the user may request or command the remote device 200 using a predefined message "air down" via the dialogical user interface 142 to decrease the temperature of the air conditioner when the queried information indicates that the temperature is higher than a predetermined threshold value (e.g. higher than 27 degree). Upon receiving the command, the remote device 200 decreases the temperature of the air conditioner and reports the decreased temperature to the mobile device 100 via the server 300. The processor 120 of the mobile device 100 may then receive the decreased temperature and display the message including the decreased temperature via the dialogical user interface 142 for viewing by the user.

In some embodiments, a predefined group of users, such as grandfather, grandmother or other dedicated persons of the tracked object, can be further configured to observe the position of the tracked object. The mobile device 100 may send an instant message including the position of the remote device 200 to all users in the predefined group via the wireless module 110 when the position of the remote device 200 is obtained.

In some embodiments, the user may also obtain historical position data of the remote device 200 from the database 310 in the server 300 via the dialogical user interface 142. For example, the user may obtain the position of the remote device at 5 pm yesterday from the database 310 in the server 300 via the dialogical user interface 142.

In summary, the mobile devices and methods for configuring a remote device of the invention can provide a dialogical user interface providing an instant message tool-like interface as the communication interface to act as the person or object being tracked to interact with a user to configure a remote device in mostly a QA mode, thus making the configuration operations easier and more friendly for the users. Moreover, by the dialogical user interface provided, it is easier for a user who may not be familiar with map control to configure a proper position for setting the safe zone and the alert or safe zone position can be recommended by the processor automatically and easily confirmed by user, thus enhancing device value and increasing better user experience.

Embodiments of the present invention as described above may be implemented in various hardware, software codes, or a combination of both. For example, an embodiment of the present invention can be a circuit integrated into a specific chip or program code integrated into suitable software to perform the processing described herein. Methods or certain aspects or portions thereof, may take the form of a program code (i.e., executable instructions) embodied in tangible media, such as floppy diskettes, CD-ROMS, hard drives, or any other non-transitory machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for configuring a remote device in a mobile device, comprising:
   providing a dialogical user interface;
   obtaining a first position of the remote device;
   displaying a question message including information of the first position via the dialogical user interface;
   receiving an answer message corresponding to the question message via the dialogical user interface; and
   determining whether to set the first position as a safe zone for the remote device in response to whether the answer message is a confirmation message or a rejection message,
   wherein when the answer message is the conformation message, setting the first position as the safe zone of the remote device and displaying the setting result via the dialogical user interface.

2. The method of claim 1, further comprising:
receiving a query message including information of a query item via the dialogical user interface;
obtaining a queried result of the query item from the remote device in response to the query message; and
displaying a message including information of the queried result via the dialogical user interface.

3. The method of claim 2, wherein the querying message comprises message for querying sensor data of a specific sensor of the remote device.

4. The method of claim 3, the specific sensor is a GPS sensor, a temperature sensor or a humidity sensor.

5. The method of claim 1, further comprising:
regularly obtaining position information of the remote device from the remote device and displaying a message including the position information of the remote device via the dialogical user interface.

6. The method of claim 5, further comprising:
transmitting the message including the position information of the remote device to a predefined group of users.

7. The method of claim 1, wherein the first position of the remote device is automatically determined by a server using historical data stored thereon.

8. The method of claim 1, further comprising:
displaying a notification message indicating that the position of the remote device is not within the set safe zone via the dialogical user interface when the position of the remote device is not within the set safe zone.

9. A mobile device, comprising:
a storage device;
a display device; and
a processor coupled to the storage device and the display device, providing a dialogical user interface on the display device, obtaining a first position of the remote device, displaying a question message including information of the first position via the dialogical user interface, receiving an answer message corresponding to the question message via the dialogical user interface, and determining whether to set the first position as a safe zone for the remote device in response to whether the answer message is a confirmation message or a rejection message,
wherein when the answer message is the conformation message, the processor sets the first position as the safe zone of the remote device and displays the setting result via the dialogical user interface.

10. The mobile device of claim 9, whether the processor further receives a query message including information of a query item via the dialogical user interface, obtains a queried result of the query item from the remote device in response to the query message and displays a message including information of the queried result via the dialogical user interface.

11. The mobile device of claim 10, wherein the querying message comprises message for querying sensor data of a specific sensor of the remote device.

12. The mobile device of claim 11, the specific sensor is a GPS sensor, a temperature sensor or a humidity sensor.

13. The mobile device of claim 9, wherein the processor further regularly obtains position information of the remote device from the remote device and displaying a message including the position information of the remote device via the dialogical user interface.

14. The mobile device of claim 13, wherein the processor further transmits the message including the position information of the remote device to a predefined group of users.

15. The mobile device of claim 9, wherein the safe zone information is automatically determined by a cloud server using historical data stored thereon.

16. The mobile device of claim 9, wherein the processor further displays a notification message indicating that the position of the remote device is not within the set safe zone via the dialogical user interface when the position of the remote device is not within the set safe zone.

* * * * *